United States Patent
Stein

(10) Patent No.: US 7,664,314 B2
(45) Date of Patent: Feb. 16, 2010

(54) METHOD FOR THE ANALYSIS OF CORRESPONDENCES IN IMAGE DATA SETS

(75) Inventor: Fridtjof Stein, Ostfildern (DE)

(73) Assignee: Daimler AG, Stuttgart (DE)

( * ) Notice: Subject to any disclaimer, the term of this patent is extended or adjusted under 35 U.S.C. 154(b) by 559 days.

(21) Appl. No.: 10/578,414

(22) PCT Filed: Oct. 15, 2004

(86) PCT No.: PCT/EP2004/011633

§ 371 (c)(1),
(2), (4) Date: May 5, 2006

(87) PCT Pub. No.: WO2005/048195

PCT Pub. Date: May 26, 2005

(65) Prior Publication Data

US 2007/0121998 A1    May 31, 2007

(30) Foreign Application Priority Data

Nov. 6, 2003   (DE) ................................ 103 51 778

(51) Int. Cl.
*G06K 9/00*   (2006.01)
*G06K 9/46*   (2006.01)
(52) U.S. Cl. .................. 382/154; 382/103; 382/119; 382/190
(58) Field of Classification Search ............. 382/119, 382/232, 103, 190, 187, 115, 154; 705/18, 705/64, 45; 156/277; 348/E7.056, E7.024; 358/448; 713/176, 186; 380/55, 54, 30, 380/200, 201, 217, 22, 28; 235/380, 379, 235/200
See application file for complete search history.

(56) References Cited

U.S. PATENT DOCUMENTS 5,390,359 A * 2/1995 Damerau ..................... 707/3

(Continued)

FOREIGN PATENT DOCUMENTS

WO    WO 98/03021    1/1998

OTHER PUBLICATIONS

Fridtjof Stein: Efficient Computation of Optical Flow Using the Census Transform, DAGM 2004, pp. 79-86, 2004.

*Primary Examiner*—Sheela C Chawan
(74) *Attorney, Agent, or Firm*—Patent Central LLC; Stephan A. Pendorf

(57) ABSTRACT

Processing of image data relating to moving scenarios, especially for recognizing and tracking objects located therein, requires identifying corresponding pixels or image areas in the individual successive image data sets. Likewise, processing of stereo images requires identifying the data areas which correspond to each other in two images that are recorded substantially at the same time from different angles of vision. According to the novel method of analyzing correspondences in image data sets, the image data sets that are to be compared are transformed using a signature operator such that a signature string is calculated for each pixel and is stored in a signature table allocated to the individual image data sets along with the pixel coordinates in a first step. A correspondence hypothesis is then generated for the signature strings identified in both tables and is stored in a list of hypothesis is then generated for the signature strings identified in both tables and is stored in a list of hypotheses for further processing. The inventive method advantageously makes it possible to analyze correspondences in a very efficient manner regarding the computing time while allowing fast processing of image pairs even when individual objects are presented at very different points in the two data sets.

15 Claims, 2 Drawing Sheets

U.S. PATENT DOCUMENTS

| | | | | |
|---|---|---|---|---|
| 5,809,160 A | * | 9/1998 | Powell et al. | 382/100 |
| 6,072,888 A | * | 6/2000 | Powell et al. | 382/100 |
| 6,456,737 B1 | | 9/2002 | Woodfill et al. | |
| 2003/0179951 A1 | | 9/2003 | Christiansen | |

* cited by examiner

10a

| 124 | 74 | 32 |
|---|---|---|
| 124 | 64 | 18 |
| 157 | 116 | 84 |

10b

| 2 | 1 | 0 |
|---|---|---|
| 2 |   | 0 |
| 2 | 2 | 2 |

27

-> Signature string: 2100

METHOD FOR THE ANALYSIS OF CORRESPONDENCES IN IMAGE DATA SETS

CROSS REFERENCE TO RELATED APPLICATION

This application is a national stage of PCT/EP2004/011633 filed Oct. 15, 2004 and based upon DE 103 51 778.2 filed on Nov. 6, 2003 under the International Convention.

BACKGROUND OF THE INVENTION

1. Field of the Invention

The invention concerns a method for analysis of correspondences in image data sets and a device suitable for carrying out the process as set forth below.

2. Description of Related Art

In the processing of image data relating to moving scenes, in particular in the recognition and tracking of objects located therein, it is necessary to identify image points or, as the case my be, image areas, which correspond to each other in the separate chronologically sequential image data sets.

It is however difficult, particularly with monocular camera systems, to recognize objects from the image data obtained from the environment and to measure their movement parameters. One possibility is provided however by the analysis of the optical flow of objects within the image data. The optical flow describes the displacement of an image point of an object recorded at time i relative to the image points recorded at time j. The problem which occurs herein is comprised of determining which of the image points at moment i correspond with which image points of the camera image at moment j, that is, belongs to the same object. Hypotheses are set up in connection with this correspondence problem to be solved, regarding which pair of image points (image pixels) from the image at moment i and from the image at moment j correspond to each other. These hypotheses are then recorded in a hypothesis list for further processing, such as geometric object generation and object monitoring or tracking.

In the past years a large number of individual algorithms for optical flow have been developed, of which the most recognized are compared in an overview article by Barron et al. Barron distinguishes between:

Differential techniques, in which the optical flow is computed on the principle of location and time limited intensity changes ("spatial temporal derivatives of image intensities") of the image points, Matching—techniques, in which the change in position of objects mostly including multiple image points are observed in defined time intervals, and on the basis of this displacement of the these objects their speed and therewith the optical flow is determined, Energy—based techniques, in which the computation of the optical flow is based on the output energy of speed—optimal filters. These types of techniques are also referred to as frequency based techniques, since the speed adapted filters are defined in their frequency range (Fourier domain), Phase based techniques, which are based on the principle, that speed in image data are reproduced in the phase relationship of the output signal of band past filters.

The known methods are based, as a rule, on computationally intensive correlation extensions and are in general only capable of measuring small displacements of objects (small optical flow) from one recorded image to the next. In particular, when using this type of algorithm in image recognition in motor vehicles, there occurs the problem, that the available controlled devices only have limited computational resources, in particular in the case of an aggressive steering movement or a high vehicle speed, large optical flows occur in the image data.

Besides the use of correspondence analysis in the determination of the optical flow of objects from chronologic occurring sequential image data sets, it is also necessary in stereo image processing to identify, in images recorded at essentially the same moment from different angles of view, those data areas which correspond with each other. The areas identified as corresponding are then associated with an object, so that from the known geometric relationship of the camera position and direction of view the distance and position of the object can be determined. Since the functional principle of the stereo image processing is based particularly thereupon, that one and the same object is recorded in essentially simultaneously recorded image data at different locations, the correspondence analysis represents the computationally intensive part of the image evaluation and it is the capacity limiting factor, in particular in applications in which only a limited amount of the computation resources can be made available.

SUMMARY OF THE INVENTION

The task of the invention is thus to provide a process for analysis of correspondences in image data sets and a device suitable for carrying out this process, which efficiently uses computational resources and is capable of processing large optical flows. This task is solved by a process and a device for analysis of correspondences in image data sets as set forth in the independent patent claims. Advantageous embodiments and further developments of the invention can be seen from the dependent claims.

In the novel process for correspondence analysis in image data sets, individual image points are compared within two image data sets i 20 and j 21, in order to identify corresponding image points (pixels) u .sub.i v .sub.i and u .sub.j v .sub.j. For this, in inventive matter, in a first step the image data set i 20 is transformed with a signature operator in such a manner, that for each pixel u .sub.i v .sub.i a signature string 27 is computed and stored in a signature table 22 together with the pixel coordinates. in a special manner then, in a next step, each pixel u .sub.j v .sub.j of the other image data set j 21 is transformed by means of the same signature operator, whereupon the resulting signature strings 27 together with the respective pixel coordinates are recorded in a further signature table 23 associated with a further image data set j 21. Subsequently then, the entries in the two signature tables 22 23 are examined with respect to whether signature strings 27 exist which can be found in both tables, whereupon in these cases a correspondence hypothesis 25 is generated for coordinates associated with these data strings 27 and stored in a hypothesis list 27 for further processing. In simple manner, the correspondence hypothesis can be defined in such a way, that when corresponding signature strings 27 are found in both signature tables 22, 23, it is presumed, that the respective image points of the image pairs correspond to images of the same object or, as the case may be, parts thereof It is immaterial for the present invention whether, in the framework of the inventive physical form of the device for correspondence analysis, the storage capacity for storage of the signature tables 22, 23 associated with the image data sets i j physically or virtually are divided into two memory areas. In each case a unit for generation of a signature string associated correspondence hypothesis is connected downstream of this storage unit, which is provided with a memory for storage of these correspondence hypothesis 25 in the form of a hypothesis list 26.

By the invention, in advantageous manner, with regard to computation time, a very efficient correspondence analysis is made possible, which is also capable of processing image pairs rapidly even when individual objects in the two image data sets are represented at very different points in the two image data sets.

BRIEF DESCRIPTION OF THE DRAWINGS

In the following the invention and the advantageous embodiments thereof will be described in greater detail on the basis of illustrative examples and with the aid of figures.

FIG. 1 shows the census transformation and the signature strings resulting therefrom.

DETAILED DESCRIPTION OF THE INVENTION

Figure 2:
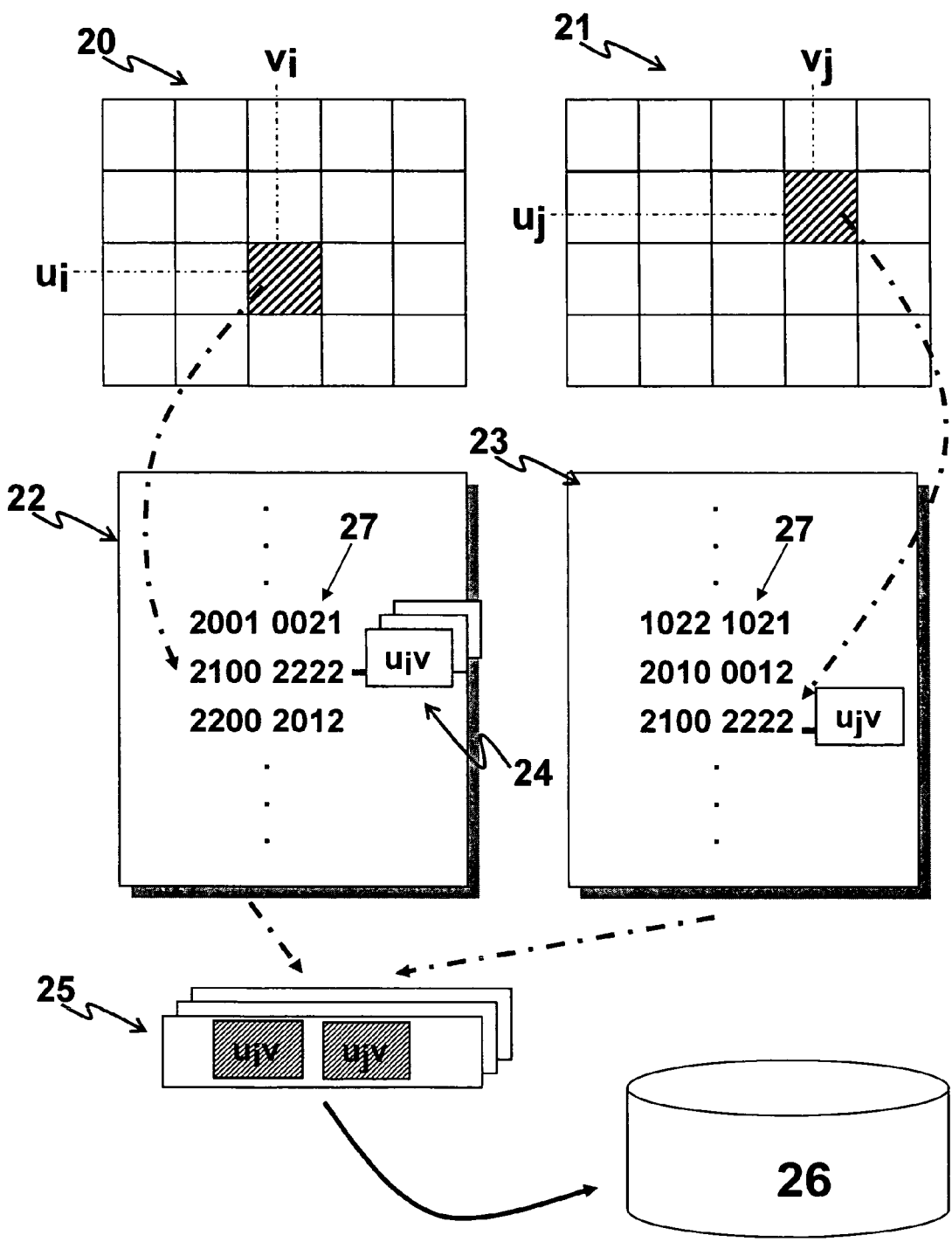
FIG. 2 schematically describes the sequence of the correspondence analysis.

In particularly advantageous manner the signature operator for transformation of the individual image points is in the form of a census operator, which corresponds to a non-linear transformation of the image data surrounding an image point. The functionality of the census transformation is explained on the basis of the example shown in FIG. 1. For this, in FIG. 1a, a 3×3 image point (pixel) encompassing section of a gray value image is schematically shown. Each of the nine image points contains a particular gray value, which here is indicated at the corresponding location of the image point; in a gray value range of 0-255, a value of 157 represents a very light pixel, while a gray value of 18 describes a very dark, nearly black pixel. If now with regard to the average image point a census transformation occurs (here: gray value 64), then this gray value is compared with the gray value of the adjacent point. Thereby the differential of the gray values is derived and compared with threshold values, wherein the respective adjacent image points on the basis of this comparison are associated with a special value:

0, if the gray value of the adjacent pixel is smaller then the pixel to be transformed, 1, when the grey value of the adjacent pixel deviates by less then a pre-determined value (in general by less then 16) from the pixel to be transformed, 2, when the grey value of the adjacent pixel is larger then the pixel to be transformed.

In the present example there results, in the framework of the transformation of the central image point with the gray value 64, the assignment of values listed in FIG. 1b to the adjacent image points. Beginning with these values then, in simple manner a signature string 27 describing the central image point can be generated, in which for example the value are sequenced in the clockwise direction beginning from top left, here there results a signature string 27 with a value "21002222". Of course, it is possible to again transform this signature string, in order to adapt it to a particular algorithm or memory hardware. Thus, in this case the signature string 27 could be transformed for example from the base 3 system into a base 10 system (here "5183").

Of course it is conceivable to carry out the comparison of the image point to be transformed with its neighbors on the basis of a number of otherwise set threshold values or also to otherwise define the neighborhood. Thus it would also be possible in advantageous manner not to evaluate the directly adjacent image points but rather to skip over these and evaluate first the once-removed fifteen image points (adjacent separation 2). Thereby, on the one hand, a longer signature string would result, the gray values of the image points compared with each other would however be substantially non-correlated. There also exists the possibility, that adjacent image points be only extracted or considered partially, wherein for example, in the manner of a star, only every other adjacent point is considered for transformation.

In particularly efficient manner the signature tables 22, 23 can be set up and processed, if they are organized in the form of a hash table. A hash table makes it possible to directly address an individual table data entry beginning with the value to be entered for a particular location (here; signature string 27); that is, each signature string 27 is assigned a specific table place or as the case may be, memory place. The length of the table can however, independent of the number of different signature strings 27, be limited to the extent, that in an individual table place within the hash table multiple entries can be entered, referenced to each other. The individual entries are herein assigned, according to a computation rule, to the available table places and are there connected with the existing entries with a referencing or indexing. This deviation provides the advantage, that for a large number of different signature strings 27 only a limited memory capacity need be reserved.

In order to further optimize the memory space necessary for the inventive correspondence analysis, in advantageous manner, prior to the recording of a signature string 27 with its associated pixel coordinates in a signature table 22, 23, these can be examined to the extent, whether already a signature string 27 corresponding to this signature string is already recorded in the table. If this is the case, then the newest signature string is not recorded. Instead, only the pixel coordinates associated with the signature string are added as supplemental pixel coordinates to the already present table entry of the same signature string.

In particularly advantageous manner, the correspondence analysis can be efficiently designed thereby, that the process prior to the entry of the signature string 27 in the signature tables 23, 23 or, as the case may be, prior to the generation of the correspondence hypothesis 25, filters can be built in, which only enter sensical signature strings, or, as the case may be, only admit plausible correspondence hypothesis.

In this sense there can in particular manner be provided a statistical application-specific filter, in that in the framework of the correspondence analysis a memory is accessed prior to the entry of a signature string 27 in the signature tables 22, 23 in which signature strings are recorded, from which occurrence it can be presumed, that the pixel associated with such a signature string 27 need not be taken into consideration in the correspondence analysis.

This could involve signature strings typical of, for example, sky or street areas, which in most applications need not be further evaluated. It is here also very conceivable not to record applications specific typical signature strings of geometric objects not needing further evaluation or object fragments in the memory herein this could concern for example, a signature string, which represents an edge fragment without corner or closure information. Such edge fragments cannot be definitely associated with other edge fragments in subsequent images (each edge fragment with the same signature in a corresponding image could be an image of this one edge fragment), so that no useful correspondence analysis for these image data segments can be carried out. Thus, an advantageous manner, prior to the recording of a signature string 27 with its associated pixel coordinates in a signature table 22, 23, this is first checked with regard to whether it corresponds with a signature string already recorded in this memory. If this is the case, then the signature string 27 and its associated pixel coordinates are not recorded in the signature table 22, 23. Further, a dynamic filter is conceivable, which further increases the efficiency of the correspondence analysis with regard to the generation of correspondence hypothesis 25. For this, prior to the generation of the correspondence hypothesis the entries of the signature strings 27 in the signature tables 22, 23 are checked with regard whether a signature string frequently occurs in the signature tables 22, 23. In this case the relevant or concerned signature string 27 is not taken into consideration for generation of a correspondence hypothesis. In this manner it is avoided that an immense number of similar correspondence hypothesis 25 are generated.

As to what number of similar signature strings 27 are to be considered frequent, this depends upon the type of the signature operator. If the census operator is employed as the signature operator, then a frequency of ten has been found to be useful for an operator which considers only the next adjacent, while for an environment consideration which takes into consideration the once removed neighbor, for a conclusion of frequent occurrence upon exceeding a frequency threshold value, the value of three is found useful.

A further dynamic filter with regard to the generation of a correspondence hypothesis 25 can be created thereby, that prior to the generation of the correspondence hypothesis from the signature strings occurring with correspondence in the two signature tables 22, 23, additionally the image data and/or the image recording situation concerning parameters associated with the signature strings can be taken into consideration. As a result of this consideration, a correspondence hypothesis is generated only then when the supplementally to be considered parameters do not deviate from each other beyond a predetermined value. Herein, as one of the supplementally to be considered parameters, there can in particular manner be considered the brightness of the individual transformed image points. Mostly the signature operator, thus also the census operator, evaluates only the relative light intensity differences of the image point to be transformed relative to the adjacent image point. The absolute light intensity value of the image point is lost in the framework of the transformation, so that it is conceivable, that two images having clearly different base intensity exhibit the same signature string 27. It is however as a rule to be presumed, that in this case these two image areas in the two image data sets selected for correspondence evaluation do not actually correspond to each other, so that a correspondence hypothesis 25 based on these two image points does not appear useful and plausible. In particular from the perspective of the efficiency of the correspondence analysis, a generation of a correspondence hypothesis should be declined.

In special manner, the pixel coordinates associated with the signature strings 27 could also be consulted as parameter to be considered. Therein it would be of particular interest to know, whether the concerned image points are located in the center or the edge area of the image described by the image data i 20 or j 21. This for the reason, that on the basis of the known image recording geometry and image or map geometry of those objects, which are located in the edge area of the image data set 20, 21, in the case of identical relative speed with reference to the image recording device in the same period of time, move along a greater distance, than would be the case for objects which are depicted closer to the center of the image data set. This means, that the signature strings of image points in the edge area of the image data set in sequential images larger deviations in their respective pixel coordinates can be tolerated with regard to a plausible correspondence hypothesis than would be the case for pixel coordinates of signature strings to which image points are associated close to the center of the image.

Of course, the inventive correspondence analysis is not limited to the analysis of camera image data (parallel recorded stereo image data or sequential image information in the framework of an object tracking), but rather the person of ordinary skill can apply this to other image forming sensor systems; for example, radar or lidar systems or combined systems for censor fusion of radar and camera. The process can also of course be used for correspondence analysis of camera image data, which are produced by camera systems employing various wave length regions, by suitable appropriate adaptation.

Now that the invention has been described, I claim:

1. A process for recognition and tracking of objects in image data relating to moving scenes, wherein a correspondence analysis is carried out in separate chronologically sequential image data sets in order to identify within two image data sets i(20) and j(21) image points (pixels) $u_i,v_i u_j,v_j$ corresponding with each other, said correspondence analysis comprising:
   in a first step, transforming the image data set i with a signature operator whereby for each pixel $u_i,v_i$ a signature string (27) is computed and recorded in a signature table (22) together with the pixel coordinates;
   in a subsequent step, transforming each pixel $u_j,v_j$ of the other image data set j using the same signature operator, whereupon the resulting signature strings are recorded together with the respective pixel coordinates in an additional signature table (23);
   checking the entries in the two signature tables (22, 23) with respect to whether signature strings exist which can be found in both tables (22, 23);
   for corresponding signature strings found on both tables (22, 23), generating a correspondence hypothesis (25) for the coordinates associated with the signature strings (27) with the initial presumption that when corresponding signature strings (27) found on both signature tables (22, 23) the respective image points of the image pairs correspond to images of the same object or part thereof;
   storing the correspondence hypothesis (25) in a hypothesis list (26) for further processing.

2. The process according to claim 1, wherein a census operator is employed as the signature operator, which corresponds to a non-linear transformation of the image data (20, 21) surrounding an image point.

3. The process according to claim 1, wherein the signature tables (22, 23) are organized in the form of a hash table.

4. The process according to claim 1, further comprising:
   examining, prior to the recording of a signature string (27) with its associated pixel coordinates in a signature table (22, 23), whether a signature string (27) corresponding to the signature string has already been recorded in the table; and
   in the cases in which a corresponding signature string (27) has already been recorded, the newest signature string is not recorded, but rather only the pixel coordinates associated therewith are added as supplemental pixel coordinates to the already existing table entry of the corresponding signature string.

5. The process according to claim 1, further comprising accessing a memory, in which in particular applications-specific signature strings are recorded, of which, upon their occurrence, it can be assumed that pixels associated with such a signature string (27) need not be taken into consideration during the correspondence analysis, and prior to the recording of a signature string (27) with its associated pixel coordinates in a signature table (22, 23), checking this with respect to whether it corresponds with a signature string already recorded in this memory, whereupon in this case, the signature string (27) and its associated pixel coordinates are not recorded or entered in the signature table (22, 23).

6. The process according to claim 1, wherein, prior to the generation of the correspondence hypothesis, the entry of the signature string (27) in the signature tables (22, 23) is checked with regard to whether a signature string occurs frequently in one of the signature tables (22, 23), whereupon in this case, the relevant signature string (27) is not considered for a generation of a correspondence hypothesis.

7. The process according to claim 1, wherein prior to the generation of the correspondence hypothesis of corresponding signature strings appearing in both signature tables (22, 23), supplementally the image data and/or image recording situation relevant parameters are taken into consideration, and that a correspondence hypothesis is generated only when these supplementally to be considered parameters of the two individual image points taken into consideration in the correspondence analysis do not deviate beyond a predetermined value.

8. The process according to claim 7, wherein the light intensity of the individual image points describes one of the supplementally to be considered parameters.

9. The process according to claims 7 or 8, wherein one of the supplementally to be considered parameters is the pixel coordinates of the image points with corresponding signature strings (27).

10. The process according to claim 9, wherein it is herein supplementally taken into consideration whether the relevant image points are located in the center or on the edge area of the image described by the image data i (20) or j (21), wherein in the case of image data which are located in the edge area of the image data set (20, 21) larger deviations of the pixel coordinates can be permitted.

11. The process as in claim 1, wherein the correspondence analysis is applied to the computation of optical flow within a sequence of camera image data.

12. The process as in claim 1, wherein said process is used for correspondence analysis within an image pair in stereo image processing.

13. A device for correspondence analysis in image data sets in order to identify within two image data sets ij image points (pixels) $u_i v_i$ and $u_j v_j$ corresponding to each other, wherein the device includes a signature operator, by means of which both the image data set i (20) as well as the image data set j (21) are transformed in such a manner, that for each of the pixels $u_i v_i$ and $u_j v_j$ a signature string (27) is computed, a memory unit, which is so designed, that it is physically or virtually divided into two memory areas, which respectively include one of the signature tables (22, 23) associated with one of the image data sets ij, in which the signature strings (27) determined by means of the signature operator can be stored with their associated pixel coordinates; and, downstream of the memory unit, a device for generation of correspondence hypothesis (25) associated with the signature strings (27), which is provided with a memory (26) for recording these corresponding hypothesis in the form of a hypothesis list.

14. The device according to claim 13, wherein the signature operator is in communication with a memory unit, in which in particular application-specific signature strings can be recorded, from the occurrence of which it can be presumed that the pixel associated with one such signature string (27) need not be taken into consideration in the correspondence analysis, wherein upon the existence of one such signature string (27) a transfer of the signature string into the signature table (27 is prevented.

15. A process for a correspondence analysis in the computation of the optical flow within a sequence of camera image data in order to identify within two image data sets i(20) and j(21) image points (pixels) $u_i v_i$ $u_j v_j$ corresponding with each other, the correspondence analysis comprising:

in a first step, transforming the image data set i with a signature operator whereby for each pixel $u_i v_i$ a signature string (27) is computed and recorded in a signature table (22) together with the pixel coordinates;

in a subsequent step, transforming each pixel $u_j v_j$ of the other image data set j using the same signature operator, whereupon the resulting signature strings are recorded together with the respective pixel coordinates in an additional signature table (23);

checking the entries in the two signature tables (22, 23) with respect to whether signature strings exist which can be found in both tables;

for corresponding signature strings found on both tables (22, 23), generating a correspondence hypothesis (25) for the coordinates associated with the signature strings (27) with the initial presumption that when corresponding signature strings (27) found on both signature tables (22, 23) the respective image points of the image pairs correspond to images of the same object or part thereof; and storing the correspondence hypothesis (25) in a hypothesis list (26) for further processing.

* * * * *